United States Patent [19]

Winbow et al.

[11] Patent Number: 4,855,963

[45] Date of Patent: * Aug. 8, 1989

[54] SHEAR WAVE LOGGING USING ACOUSTIC MULTIPOLE DEVICES

[75] Inventors: Graham A. Winbow, Houston; Sen-Tsuen Chen, Sugarland; James A. Rice, Houston, all of Tex.

[73] Assignee: Exxon Production Research Company, Houston, Tex.

[*] Notice: The portion of the term of this patent subsequent to Mar. 10, 2004 has been disclaimed.

[21] Appl. No.: 140,871

[22] Filed: Jan. 6, 1988

Related U.S. Application Data

[63] Continuation of Ser. No. 440,140, Nov. 8, 1972, abandoned.

[51] Int. Cl.[4] ............................................. G01V 1/00
[52] U.S. Cl. .................................... 367/31; 367/912; 367/75; 367/27; 181/102
[58] Field of Search ............ 367/25, 31, 75, 160, 367/161, 912; 181/102, 106; 310/330, 333, 334, 337, 368; 364/422

[56] References Cited

U.S. PATENT DOCUMENTS

| | | | |
|---|---|---|---|
| 2,209,100 | 7/1940 | Minton | 367/43 |
| 3,325,780 | 6/1967 | Horan | 367/157 |
| 3,363,118 | 1/1968 | Sims | 367/160 |
| 3,497,731 | 2/1970 | Straube | 367/160 |
| 3,583,677 | 6/1971 | Phillips | 310/333 |
| 3,593,255 | 7/1971 | White | 367/912 |
| 3,794,976 | 2/1974 | Mickler | 181/0.5 |
| 3,821,740 | 6/1974 | Ehrlich | 367/100 |
| 3,992,693 | 11/1976 | Martin et al. | 310/337 |
| 4,134,097 | 1/1979 | Cowles | 367/24 |
| 4,207,961 | 6/1980 | Kitsunezaki | 181/106 |
| 4,237,399 | 12/1980 | Sakamoto | 310/317 |
| 4,380,806 | 4/1983 | Waters et al. | 367/25 |
| 4,446,544 | 4/1984 | Connolly | 310/337 |
| 4,516,206 | 5/1985 | McEvilly | 367/40 |
| 4,606,014 | 8/1986 | Winbow et al. | 367/75 |
| 4,649,525 | 3/1987 | Angona et al. | 367/31 |
| 4,649,526 | 3/1987 | Winbow et al. | 367/35 |
| 4,682,308 | 7/1987 | Chung | 367/75 |

FOREIGN PATENT DOCUMENTS

| | | |
|---|---|---|
| 031989 | 7/1981 | European Pat. Off. . |
| 996964 | 2/1983 | U.S.S.R. ............... 181/113 |
| 1193381 | 5/1970 | United Kingdom . |
| 1193382 | 5/1970 | United Kingdom . |
| 1193383 | 5/1970 | United Kingdom . |

OTHER PUBLICATIONS

Hardee, Downhole Periodic Seismic Sources, 1983, pp. 57–71.
Winbow, "How to Separate Compressional & Shear Arrivals in a Sonic Log", Tech. Paper 50th Annual Int. Meeting of SEG, Houston, Tex., Nov. 17–20, 1980.
Adam Gawin, "Theoretical Basis of Quadrupole Well Logging", Acta Geophysica Polonica, vol. 19, No. 2, 1971, pp. 181–204.
J. E. White, "The Hula Log: A Proposed Acoustic Tool", Presented at the 8th SPWLA Conference, Denver (1967).

Primary Examiner—Thomas H. Tarcza
Assistant Examiner—Daniel T. Pihulic
Attorney, Agent, or Firm—H. E. O'Niell

[57] ABSTRACT

The multipole shear wave logging device of this invention includes a logging sonde, means for generating a $2^n$-pole shear wave in an earth formation surrounding a borehole containing liquid where n is an integer greater than 2, and means for detecting in the liquid the refraction of the $2^n$-pole shear wave. In the preferred embodiment the generating means comprises six similar sectors of a hollow piezoelectric cylinder. The six sectors are polarized radially and are so connected to the sonde that they are in the form of a split cylinder coaxial with the sonde axis. Electrical pulses of similar wave forms are applied across the inner and outer cylindrical surfaces of each sector. The electrical pulses are of such polarities that adjacent sectors vibrate radially in substantially opposite phase. Circumferentially polarized sectors may also be used in the place of radially polarized sectors. The vibrations of the six sectors will generate compressional waves in the liquid which will interfere to produce an octopole shear wave in the formation. The compressional wave in the liquid caused by refraction of such octopole shear wave is detected by detecting means. The detecting means comprises two detectors in the liquid spaced apart longitudinally from each other and from the generating means. The shear wave velocity of the formation is determined from the time interval between detections of the refraction of the octopole shear wave by the two detectors.

18 Claims, 3 Drawing Sheets

SHEAR WAVE LOGGING USING ACOUSTIC MULTIPOLE DEVICES

This application is a continuation of co-pending application Ser. No. 440,140, filed on Nov. 8, 1972, now abandoned.

This invention relates to well logging in general and more particularly, to acoustic shear wave well logging.

BACKGROUND OF THE INVENTION

In acoustic well logging, it is customary to measure the compressional wave velocity of earth formations surrounding boreholes. A conventional compressional wave velocity logging system includes a cylindrical logging sonde for suspension in a borehole liquid, a source connected to the sonde for generating compressional waves in the borehole liquid, and one or more detectors connected to the sonde and spaced apart from the compressional wave source for detecting compressional waves in the borehole liquid. A compressional wave in the borehole liquid generated by the source is refracted into the earth formation surrounding the borehole. It propagates through a portion of the formation and is refracted back into the borehole liquid at a point adjacent to the detector and is then detected by the detector. The ratio of the distance between the source and detector to the time between generation and detection of the compressional wave yields the compressional wave velocity of the formation. The distance between source and detector is usually fixed and known so that measurement of the time etween compressional wave generation and detection is sufficient to determine the compressional wave velocity of the formation. For better accuracy, such distance is usually much greater than the dimensions of the source or detector. Information important for production of oil and gas from subterranean earth formations may be derived from the compressional wave velocities of such formations.

When a compressional wave generated by a compressional wave source in the borehole liquid reaches the borehole wall, it produces a refracted compressional wave in the surrounding earth formation as described above. In addition, it also produces a refracted shear wave in the surrounding earth formation, and guided waves which travel in the borehole liquid and the part of the formation adjacent to the borehole. Part of such shear wave is refracted back into the borehole liquid in the form of a compressional wave and reaches the detector in the logging sonde. The guided waves are also detected by such detector. Any wave that is one of the three types of waves detected by the detector may be called an arrival: the compressional waves in the borehole liquid caused by refraction of compressional waves in the formation the compressional wave arrivals, those caused by refraction of shear waves in the formation the shear wave arrivals, and those caused by guided waves the guided wave arrivals. Thus, the signal detected by the detector is a composite signal which includes the compressional wave arrival, and the shear wave arrival and the guided wave arrivals. Compressional waves travel faster than shear waves and shear waves usually travel faster than the guided waves. Therefore, in the composite signal detected by the detector, the compressional wave arrival is the first arrival, the shear wave arrival the second arrival, and the guided wave arrivals the last arrivals. In measuring the compressional wave velocity of the formation, the time interval between generation of compressional waves and detection of the first arrival detected by the detector gives the approximate travel time of the refracted compressional wave in the formation. Hence the later shear wave and guided wave arrivals do not affect measurement of compressional wave velocity of the formation.

In addition to traveling over a vertical distance in the formation approximately equal to the distance between the source and detector, the compressional wave also travels over short distances in the liquid. The extra time required to travel such short distances introduces errors in the velocity log. To reduce such errors, conventional logging devices employ at least two detectors spaced vertically apart along the borehole from each other. The timer interval between detection by the two detectors is measured instead of the time interval between transmission and detection. The ratio between the distance between the two detectors and such time interval yields the compressional wave velocity. Since the compressional wave travels over approximately equal short distances in the borehole liquid before reaching the two detectors, the time interval between detection by the two detectors is a more accurate measure of the actual level time in the formation. Therefore, using two detectors and measuring the time between detection by the two detectors yield a more accurate compressional wave velocity. Other spurious effects such as borehole-size changes and sonde tilt may be reduced by conventional devices. One such device is described in *Log Interpretation,* Volume 1 - Principles, Schlumberger Limited, New York, N.Y. 10017, 1972 Edition, pages 37-38.

It is well known that shear wave velocity logging may also yield information important for production of oil and gas from subterranean earth formations. The ratio between the shear wave velocity and compressional wave velocity may reveal the rock lithology of the subterranean earth formations. The shear wave velocity log may also enable seismic shear wave time sections to be converted into depth sections. The shear wave log is useful in determining other important characteristics of earth formations such as shear stress, porosity, fluid saturation and the presence of fractures. The shear wave log may also be helpful for determining the stress state around the borehole which is very important in designing hydraulic fracture treatments.

The conventional compressional wave logging source and the compressional waves it generates in the borehole liquid are symmetrical about the logging sonde axis. When such compressional waves are refracted into the surrounding earth formation, the relative amplitudes of the refracted shear and compressional waves are such that it is difficult to distinguish the later shear wave arrival from the earlier compressional wave arrival and from the reverberations in the borehole caused by refraction of the compressional wave in the formation. Therefore it is difficult to use a conventional symmetrical compressional wave source for logging shear wave velocity. Correlation techniques have been employed to extract the shear wave arrival from the full acoustic wave train recorded. Such techniques, however, usually require processing of data by a computer so that shear wave velocities cannot be logged on line. It may also be difficult to extract the shear wave arrival if it is close in time to the compressional wave arrival.

Asymmetric compressional wave sources have been developed for logging shear wave velocity. Using such sources, the amplitude of the shear wave arrival may be sigificantly higher than that of the compressional wave arrival. By adjusting the triggering level of the detecting and recording systems to discriminate against the compressional wave arrival, the shear arrival is detected as the first arrival. It may thus be possible to determine the travel time of shear waves in the formation and therefore the shear wave velocity. Such asymmetric sources each generates in the borehole liquid a positive compressional wave in one direction and a simultaneous negative compressional wave in the opposite direction. The interference of the compressional waves may cause the shear wave arrival to be stronger than the compressional wave arrival. Asymmetric sources are disclosed by Angona et al. European Patent Application No. 31989, White, U.S. Pat. No. 3,593,255, and Kitsunezaki, U.S. Pat. No. 4,207,961.

Angona et al disclose a bender-type source which comprises two circular piezoelectric plates bonded together and attached to a logging sonde. When voltage is applied across the two piezoelectric plates, the plates will bend. The bending of the transducer plates creates a positive compressional wave in one direction and a simultaneous negative compressional wave in the opposite direction. White discloses a compressional wave source comprising two piezoelectric segments, each in the shape of a half hollow cylinder. The two segments are assembled to form a split cylinder. The two segments have opposite polarization and electric voltage is applied to each segment causing one segment to expand radially and simultaneously causing the other segment to contract radially thereby producing a positive compressional wave in one direction and simultaneous negative compressional wave in the opposite direction. In Kitsunezaki, coils mounted on a bobbin assembly are placed in the magnetic field of a permanent magnet and current is passed through the coils to drive the bobbin assembly. The movement of the bobbin assembly ejects a volume of water in one direction and simultaneously sucks an equivalent volume of water in the opposite direction, thereby generating a positive pressure change in one direction and a simultaneous negative pressure change in the opposite direction.

BREIF DESCRIPTION OF THE DRAWINGS

SUMMARY OF THE INVENTION

The method and apparatus of this invention are for logging the shear wave velocity of an earth formation surrounding a well or borehole. The method of this invention comprises transmitting a $2^n$-pole shear wave through the earth along the well wherein n is an integer greater than 2, and detecting the $2^n$-pole shear wave arrival at at least one point longitudinally spaced along the well from the point of transmission. If the shear wave arrival is detected at two points, the time lapse between the detections at the two points is measured to determined the shear wave velocity of the earth surrounding the well. If the shear wave arrival is detected at only one point, the time lapse between transmission and detection of the shear wave signal is measured to determine the shear wave velocity of the earth. The apparatus of this invention comprises a housing adapted to be raised and lowered into a well, signal generating means in the housing for transmitting a $2^n$-pole shear wave into the earth formation surrounding the well where n is an integer greater than 2, and signal detecting means in the housing longitudinally spaced along the well from the signal generating means for detecting the arrival of such shear wave.

DESCRIPTION OF THE PREFERRED EMBODIMENTS

Figure 1:
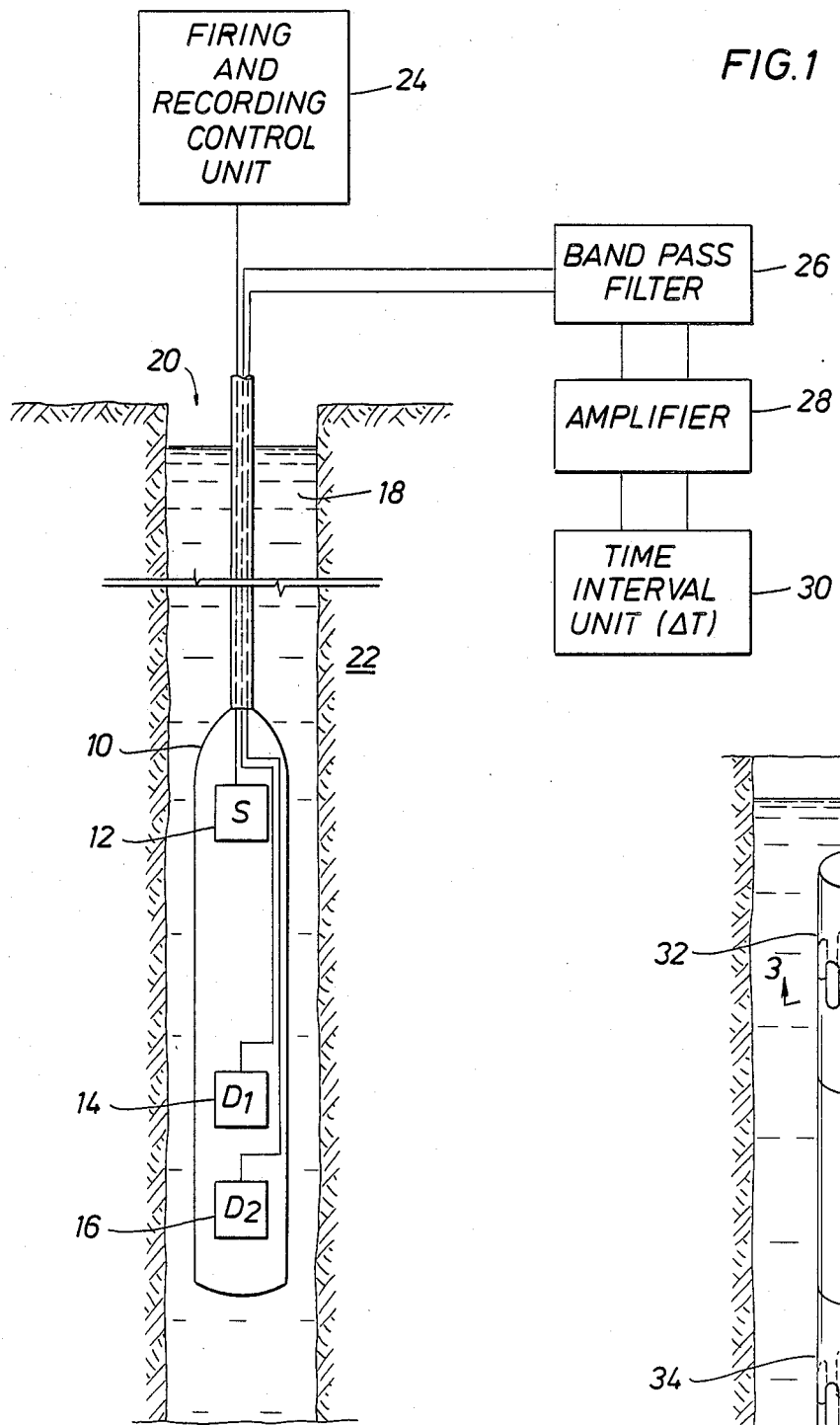
FIG. 1 is a schematic view of an acoustic logging system illustrating this invention.

FIG. 1 is a schematic view of an acoustic logging system illustrating this invention. A logging sonde 10 is adapted to be raised and lowered into a well. The sonde contains a multipole shear wave source 12 and two detectors, 14, 16. To initiate logging, sonde 10 is suspended into a liquid 18 contained in a borehole 20, which is surrounded by an earth formation 22. Detectors 14, 16 are so connected to sonde 10 that they are spaced longitudinally along borehole 20 for each other and from source 12. Source 12 is connected to a firing and recording control unit 24. Although the firing and recording control unit is shown in FIG. 1 as a separate unit from the logging sonde, the part of the unit that powers the multipole shear wave source may, for convenience of operation, be housed by the logging sonde. Signals recorded by detectors 14, 16 are fed to a band pass filter 26, an amplifier 28 and a time interval unit 30.

In a manner explained below the firing and recording control unit is used to fire source 12 which produces a shear wave in formation 22. The shear wave arrival is detected by detectors 14 and 16. Sonde 10 also contains a pre-amplifier (not shown in FIG. 1) which amplifiers the shear wave arrival detected by detectors 14, 16. The amplified signals are then filtered by filter 26 and amplified again by amplifier 28. The time interval between the detection of the arrival by detector 14 and its detection by detector 16 is then measured by time interval unti 30. Such time interval may be stored or displayed as desired.

Figure 2:
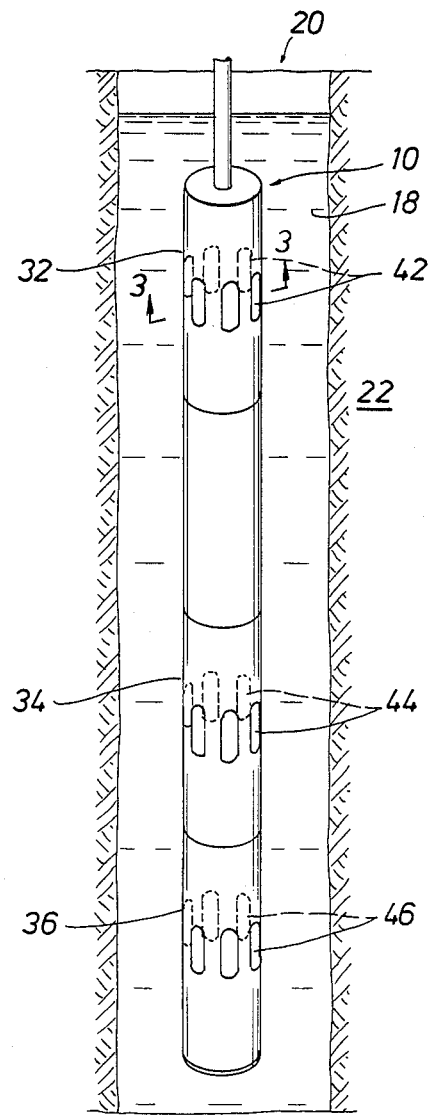
FIG. 2 is a simplified perspective view of an octopole shear wave logging device illustrating the preferred embodiment of this invention.

FIG. 2 is a simplified perspective view of an octopole shear wave logging device illustrating the preferred embodiment of the invention. As shown in FIG. 2, logging sonde 10 comprises a number of hollow cylindrical sections. The top section 32 contains an octopole shear wave logging source (not shown in FIG. 2) and has six windows 42 which allow the compressional waves generated by the source to propagate readily therethrough into the borehole liquid. Sections 34, 36, each containing a detector (not shown), are located below the source and also have windows 44, 46 as shown in FIG. 2. The combined compressional waves generated by the source in section 32 propagate through windows 42 and borehole liquid 18 to reach the wall of borehole 20. A portion of such combined compressional waves is refracted into earth formation 22 in the form of a shear wave. After such shear wave travels a distance through the formation, portions of it are refracted back into the borehole, into borehole liquid 18, to reach the detectors in sections 34, 36 through windows 44 and 46, respectively. The time interval between the detections by the two detectors is then measured as described.

The nomenclature for the multipole is based upon consecutive powers of two, that is, $2^n$, n being an integer, and n=1, 2, 3 and on indefinitely. Thus the multipoles include the dipole (n=1), the quadrupole (n=2) and the octopole (n=3). The nomenclature for higher order multipoles is based upon $2^n$ with n=4, 5, 6 and so on indefinitely.

Figure 3:
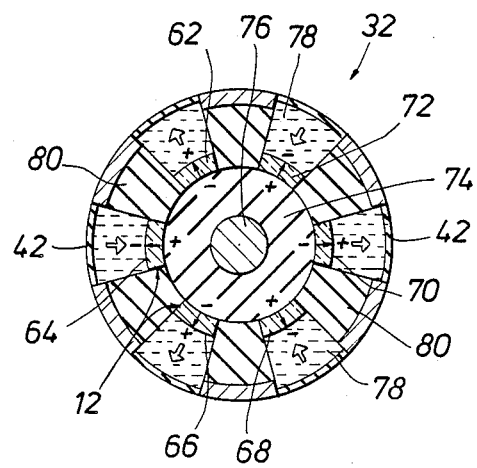
FIG. 3 is a cross-sectional view of the octopole shear wave logging source of FIG. 2 taken along the line 3—3.

FIG. 3 is a cross-sectional view of the octopole shear wave source of FIG. 2 taken along the line 3—3. Six substantially similar sectors 62, 64, 66, 68, 70, 72 of a radially polarized piezoelectric hollow cylinder are so spatially arranged that they are substantially coaxial and that they surround a common axis. Substantially the same electrical pulse is applied across the cylindrical surfaces of each sector substantially simultaneously such that the pulses supplied to any two adjacent sectors are opposite in polarity. This arrangement is illustrated in FIG. 3. With such an arrangement, if one sector is caused by the electrical pulse to expand radially then the two sectors adjacent to it will contract radially and vice versa. If the six sectors are polarized radially outward, then directions of expansion and contraction will be as illustrated by hollow arrows in FIG. 3. During contraction of a sector, its entire inner cylindrical surface will move inward. During its expansion, its entire outer cylindrical surface will move outward. The combined compressional wave so generated by the expansion and contraction of the six sectors will refract into the surrounding earth formation to generate an octopole shear wave. To detect the octopole shear wave arrival, the detectors may be of construction similar to the octopole shear wave sources illustrated in FIG. 3, or in FIG. 5, which will be described later.

The central space between the six sectors is filled by an annular body of backing material 74 to damp out the reverberations of the vibrations of the six sectors so that the octopole shear wave generated will be short in duration. This annular body 74 may be attached to section 32 by a conventional means such as inserting a mandrel 76 through the center of body 74, and screwing the two ends of the mandrel onto two disks that fit snugly into section 32. The six sectors are placed on the outer cylindrical surface of body 74 and may be kept in place by two annular rings (not shown in FIG. 3) of elastic backing material fitting snugly over the six sectors. The six sectors are so positioned in section 32 that each sector faces one of the six windows 42, as shown in FIG. 3. The sectorial spaces between the windows and the sectors are filled by oil 78. The vibrations of the six sectors will generate compressional waves in oil 78 which are transmitted through window 42 to generate an octopole shear wave in the earth. The sectorial spaces between the oil filled spaces are filled by backing material 80 for damping out the reverberations of the vibrations of the six sectors.

Figure 4:
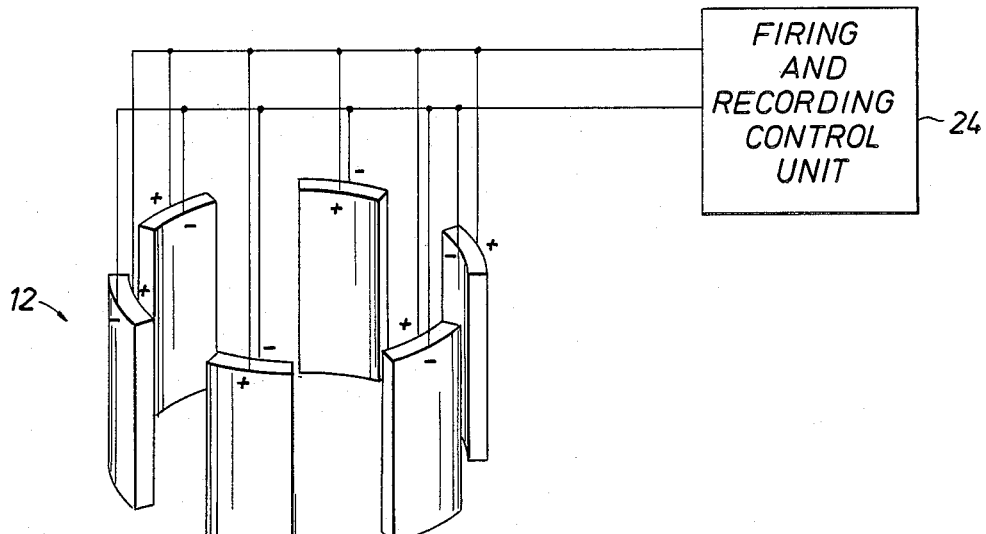
FIG. 4 is a simplified perspective view of the octopole shear wave logging device of FIGS. 2 and 3, illustrating the orientation of the detectors relative to that of the octopole source, and the electrical connections to the source and detectors.
Figure 4:
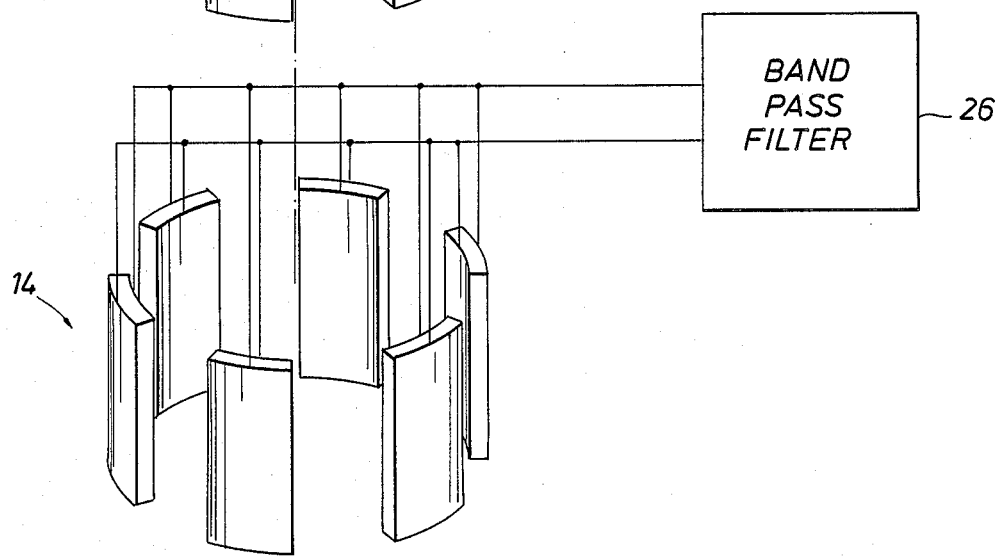

FIG. 4 is a simplified perspective view of the octopole shear wave logging device of FIGS. 2 and 3 illustrating the orientation of detectors relative to that of the octopole source, and the electrical connections to the source and the detectors. To detect the compressional wave in a borehole liquid caused by refraction of the octopole shear wave generated by source 12, detector 14 is preferably also an octopole detector of construction similar to source 12. The six sectors are placed so that they have substantially the same axis as the six sectors of source 12, and that they have substantially the same lateral positions around the common axis as the sectors of source 12 to maximize the strength of the octopole signal detected. The outer and inner cylindrical surfaces of the six sectors of the detector are connected to band pass filter 26 in a manner similar to the connections from the respective surfaces of source 12 to the firing and recording control unit 24. Detector 16 is similar to detector 14 but is not shown in FIG. 5 for simplicity. To allow the six sectors of each of the two detectors to detect the octopole shear wave arrival, sections 34, 36 of FIG. 2 each will have preferably six windows 44, 46 respectively. While the detector of FIG. 4 is shown as similar in construction to the source of FIG. 3, it will be understood that detectors of construction similar to the sources of FIGS. 5, 6, 7 (described below) may also be used. The six sectors or plates of each type of detector are preferably aligned laterally around the common axis, (that is, azimuthally) with the six sectors of the source to maximize the detected signal.

Figure 5:
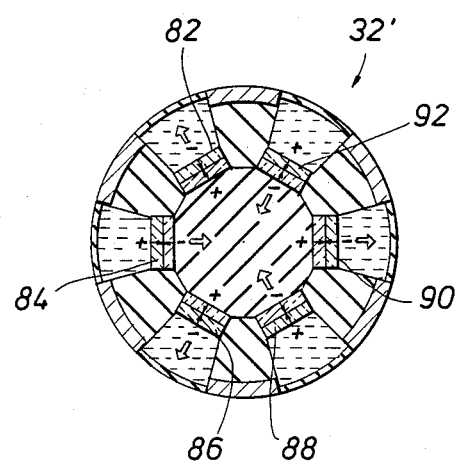
FIG. 5 is a cross-sectional view of an octopole shear wave logging source illustrating an alternate embodiment of this invention.

FIG. 5 is a cross-sectional view of an octopole shear wave source illustrating an alternate embodiment of this invention. Six elongated piezoelectric composite plates 82, 84, 86, 88, 90, 92 are so spatially arranged that they form substantially the parallelograms of a hexagonal prism. Each of the six composite plates comprises two oppositely polarized piezoelectric plates bonded together. The six composite plates are attached to section 32' of the logging sonde by two clamping plates (not shown in FIG. 5). Each of the two clamping plates has six slots into which the ends of the six composite plates are fitted snugly. The two clamping plates are then inserted into and attached to section 32' in such position that the elongated composite plates are substantially parallel to the logging sonde axis. The portion of each composite plate between the two ends will hereinbelow be called the "unclamped portion" or the "unattached portion." It will be understood, however, that the six composite plates need not be attached to the sonde at their ends. Attachment of one end, or at a location between the two ends, will suffice. Then the portion of each plate other than the attached part may be called the "unclamped portion" or the "unattached portion."

Substantially the same electrical pulse is applied across the flat surfaces of each of the six composite plates substantially simultaneously. The pulses applied to any two adjacent composite plates are opposite in polarity such that if the unattached portion of one composite plate bends and moves radially outward then the unattached portions of the two adjacent composite plates will bend and move radially inward. The directions of the bending movements of the six composite plates are illustrated by hollow arrows in FIG. 5. The bending motion of each composite plate will generate a compressional wave in the borehole liquid. The combined compressional wave generated by the octopole source will refract into the formation surrounding the borehole to produce an octopole shear wave. To detect the octopole shear wave arrival in the borehole liquid detector 14 is preferably an octopole type which may be of construction similar to the octopole sources illustrated in FIG. 3 or in FIG. 5. The outer surfaces of the composite plates of detector 14 are connected to band pass filter 26 instead of to the firing and recording control unit 24. The six sectors or plates of the detector are preferably aligned azimuthally with the six plates of the shear wave source of FIG. 5.

The composite plates comprising a pair of oppositely polarized piezoelectric plates are readily available commercially. Piezoelectric composite plates supplied by the Vernitron Company of Bedford, Ohio, known as Bender Bimorphs have been satisfactory. The six piezoelectric sectors of the type illustrated in FIG. 3 and of the types illustrated in FIGS. 6, 7 to be described later are also supplied by Vernitron Company.

Figure 6:
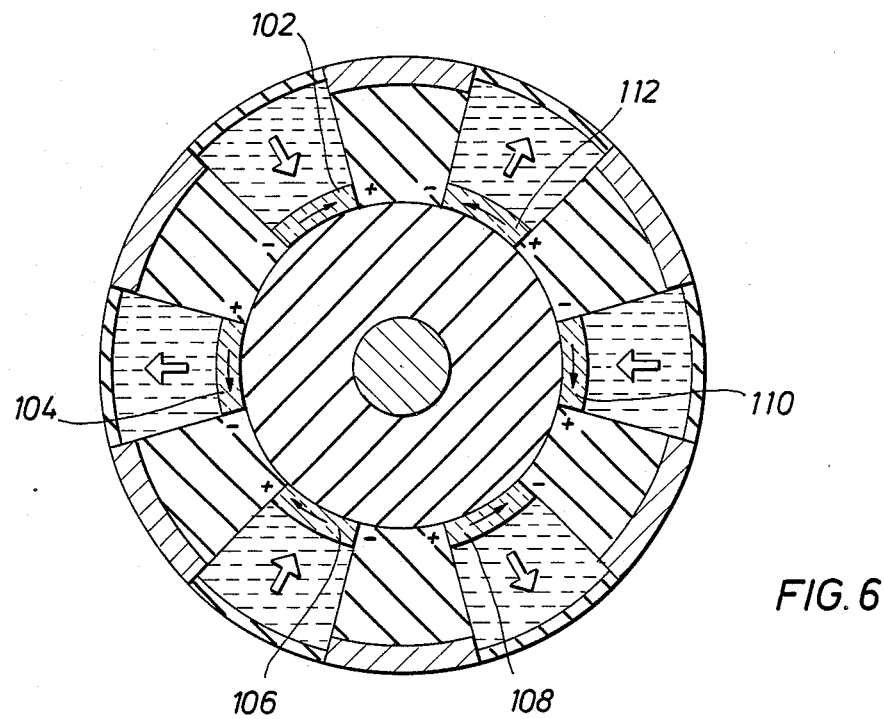
FIG. 6 is a cross-sectional view of an octopole shear wave logging source illustrating another alternate embodiment of this invention.

FIG. 6 is a cross-sectional view of an octopole shear wave source illustrating another alternate embodiment of the invention. In FIGS. 3 and 4, the six sectors of the octopole source are polarized radially. Alternatively, the six sectors may be polarized circumferentially as shown byte polarizations of sectors 102, 104, 106, 108, 110 and 112 in FIG. 6. The six sectors polarized circumferentially are in what is known as the hoop mode. The six sectors may be obtained from a hollow cylindrical piezoelectric cylinder by cutting out six narrow longitudinal sectors. An electrical pulse is applied across the side surfaces of each of the six sectors so that the resulting electric field in each sector is substantially parallel to its polarization. The electrical pulse will cause each sector to expand or contract radially depending upon the polarity of the pulse. If the sectors 102, 106, 110 are polarized in a circumferentially clockwise direction but the electric fields therein are in circumferentially counterclockwise direction as shown in FIG. 6, the three sectors will contract radially. If the polarizations of the the electric fields in sectors 104, 108, 112 are all in the circumferential counterclockwise direction, then the three sectors will expand radially.

Figure 7:
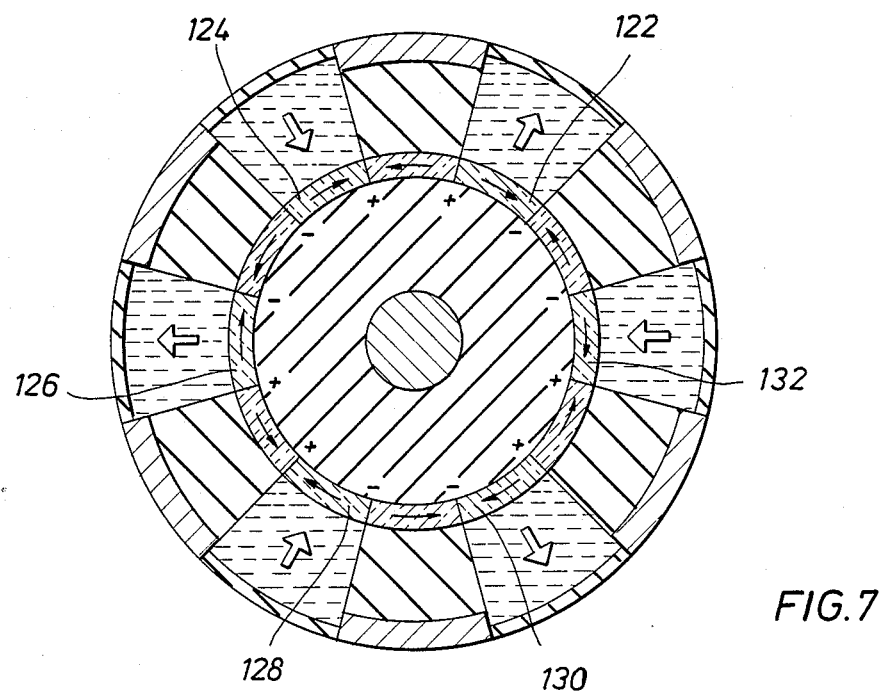
FIG. 7 is a cross-sectional view of an octopole shear wave logging source illustrating still another alternate embodiment of this invention.

FIG. 7 is a cross-sectional view of still another alternate embodiment illustrating an octopole shear wave source in the hoop mode. The six sectors, 122, 124, 126, 128, 130, 132 are six of the twelve longitudinal sectors of a piezoelectric hollow cylinder, each of the twelve sectors having been polarized circumferentially. Adjacent members have opposite circumferential polarizations. The six sectors 122, 124, 126, 128, 130, 132 are the only sectors of the cylinder which will expand and contract and are all polarized in the circumferential clockwise direction. The connecting edges of adjacent sectors may be coated by conducting layers (not shown). Electrical pulses are so applied that the electric field in each of the six sectors is substantially parallel to its polarization. With the polarizations of sectors and polarities of pulses as shown in FIG. 7, sectors 122, 126, 130 will expand radially while sectors 124, 128, 132 will contract radially. The remaining six sectors will not expand or contract since no potential difference is applied across such sectors.

In both the preferred embodiment and the three alternate embodiments described above, piezoelectric materials are used to construct the octopole shear wave source, and the source is vibrated by electrical pulses. It will be understood, however, the other constructions of the source and other vibrating means may be used. Thus purely mechanical means may be used to vibrate the six sectors of the preferred embodiment, and the six plates or sectors of each of the three alternate embodiments.

An octopole shear wave will be generated so long as the sectors or the plates are caused to vibrate in the same manner as in the preferred and alternate embodiments.

The octopole shear wave source of this invention may be used to log shear wave velocities on line (that is, the shear wave velocities may be determined without data processing) if the shear wave arrival is significantly greater in amplitude than the compressional wave arrival. The shear wave arrival is significantly greater in amplitude than the compressional wave arrival only when the frequencies of the octopole shear wave produced in the earth surrounding the borehole are within certain frequency ranges. For any earth formation there is a preferred frequency range for logging the shear wave velocity so that the shear wave arrival is significantly stronger than the compressional wave arrival. The preferred frequency range varies with the shear wave velocity of the formation to be logged. Thus if the approximate range of the shear wave velocities of the formation is known, a preferred range of frequencies can be chosen. For a well with ten inches diameter the preferred frequency ranges are shown in the table below.

| Approximate Range of Shear Wave Velocities (ft/sec) | Preferred Frequency Range (kHz) |
| --- | --- |
| 5000–6000 | 3.7–12.6 |
| 6000–7000 | 3.8–20 |
| 7000–8000 | 3.9–26.5 |
| 8000–9000 | 4.1–33 |

The approximate range of shear wave velocities of a formation may be estimated by conventional methods such as measuring the compressional wave velocities of the formation. The shear wave velocity is approximately one-half the compressional wave velocity. From the measured compressional wave velocities the approximate range of shear wave velocities may be estimated. The preferred frequencies vary inversely with the diameter of the well. Therefore for a well with diameter d inches instead of ten inches the preferred frequency ranges are given by those listed in the table above multiplied by a factor 10/d.

FIGS. 3, 4, 6, 7 illustrate octopole shear wave sources employing six sectors which are vibrated radially to generate octopole shear waves in earth formations. The frequencies of the octopole shear waves so generated vary inversely with the radii of the sectors. For the frequencies to be within the preferred frequency ranges listed above, it is preferable that the radii of the sectors be large. Therefore, their radii are preferably only slightly smaller than the radius of the logging sonde. It will be understood that FIGS. 3, 4, 6, 7 are not drawn to scale.

The higher order multipole sources may be constructed in a manner similar to the four embodiments of the octopole shear wave source illustrated in FIGS. 3, 5, 6 and 7. Thus the 16-pole source may be constructed by spatially arranging 8 elongated piezoelectric composite plates to form the 8 parallelograms of an octagonal prism. Substantially the same electrical pulse is applied to each of the eight composite plates with such polarity that adjacent plates vibrate in substantially opposite phases. An alternative embodiment of the 16-pole source is constructed if the eight composite plates are replaced by eight substantially identical sectors of a radially or circumferentially polarized piezoelectric hollow cylinder. Substantially the same electrical pulse is applied to each sector such that adjacent sectors vibrate in substantially opposite phases. Other ways of constructing and vibrating the plates and sectors may be used so long as the plates and sectors are vibrated in the same manner. Other higher order multipoles may be constructed in a manner similar to the octopole and 16-pole. Preferably the detectors used to detect the higher order shear wave arrivals will be of an order that matches the order of the source.

The number of composite plates or sectors in the embodiments of the octopole and the 16-pole sources described above does not match the nomenclature of the octopole and 16-pole sources. Thus the octopole source comprises 6 plates or sectors and the 16-pole source 8 plates or sectors. The 32-pole source comprises 10 plates or sectors. Thus while the nomenclature of the multipole sources is based on $2^n$, n being an integer, with n=1, 2, 3...., the corresponding number of plates or sectors is 2n. Thus, a dipole (n=1) source comprises $2\times1$ or 2 plates or sectors. A quadrupole (n=2) source comprises $2\times2$ or 4 plates or sectors. An octopole (n=3), a 16-pole (n=4) and a 32-pole (n=5) source comprises 6, 8 and 10 plates or sectors respectively. Therefore, in general, a $2^n$-pole source will comprise 2n plates or sectors, n being an integer, where n=1, 2, 3 and so on indefinitely.

The above description of method and constructions used is mereby illustrative thereof and various changes in shapes, sizes, materials, or other details of the method and construction may be within the scope of the appended claims.

We claim:

1. A method of acoustic shear well wave logging of the earth surrounding a well which comprises operating a source of substantially only $2^n$-pole acoustic waves in the well to transmit from the well a $2^n$-pole shear wave through the earth along the well wherein n is an integer greater than two, and detecting the $2^n$-pole shear wave arrival at at least one point longitudinal spaced along the well from the point of transmission.

2. The method of claim 1, further comprising measuring the time lapse between the transmission and detection of the $2^n$-pole shear wave to determine the shear wave velocity of the earth surrounding the well.

3. The method of claim 1, wherein the $2^n$-pole shear wave arrival is detected at two points having known spacing therebetween, said two points being spaced longitudinally along the well from each other, said method further comprising measuring the time lapse between the detections at the two points to determine the shear wave velocity of the earth surrounding the well.

4. The method of claim 1, wherein the well contains a liquid and wherein the $2^n$-pole shear wave is transmitted into the earth by generating in the liquid a number of compressional waves which will interfere to produce the $2^n$-pole shear wave in the earth surrounding the liquid.

5. The method of claim 1, wherein the multipole shear wave is an octopole shear wave.

6. A method of logging the earth surrounding a well which contains a liquid, comprising:

operating a source of substantially only octopole acoustic waves in the well to transmit an octopole shear wave from the well through the earth along the well;

detecting the octopole shear wave arrival at at least one point longitudinally spaced along the well from the point of transmission; and determining the approximate range of shear wave velocities of the earth surrounding the liquid and wherein the frequencies of the octopole shear wave are in the preferred frequency range corresponding to the approximate range of shear wave velocities of the earth surrounding the liquid in accordance with the table below:

| Approximate Range of Shear Wave Velocities (ft/sec) | Preferred Frequency Range (kHz) |
| --- | --- |
| 5000–6000 | 10/d (3.7–12.6) |
| 6000–7000 | 10/d (3.8–20) |
| 7000–8000 | 10/d (3.9–26.5) |
| 8000–9000 | 10/d (4.1–33) | where d is the borehole diameter in inches.

7. An apparatus for acoustically logging an earth formation surrounding a borehole which contains a liquid, said apparatus comprising:

a logging sonde adapted to be suspended into the liquid in the borehole;

a shear wave source comprising 2n members connected to the logging sonde where n is an integer greater than two, each member comprising a sector of a hollow cylinder wherein the 2n sectors are so connected to the logging sonde that they are substantially coaxial and they surround a common axis;

means connected to the logging sonde for vibrating the 2n sectors radially, substantially simultaneously and in substantially the same manner such that adjacent sectors vibrate in substantially opposite phase to generate a $2^n$-pole shear wave in the earth formation;

means connected to the logging sonde for detecting at at least one selected location in the liquid spaced longitudinally along the borehole from the 2n members the refracted compressional wave in the liquid caused by refraction of the $2^n$-pole shear wave.

8. The apparatus of claim 7 wherein n is equal to 3 and the vibrations of the six sectors generate an octopole shear wave in the formation.

9. The apparatus of claim 7, wherein the detecting means comprises 2n sectors of a hollow cylinder wherein said 2n sectors of the detecting means are substantially coaxial and they surround the common axis of the sectors of the shear wave source, and wherein said 2n sectors of the detecting means are aligned laterally around the common axis with the six sectors of the shear wave source.

10. An apparatus for acoustically logging an earth formation surrounding a borehole which contains a liquid, said apparatus comprising:

a logging sonde adapted to be suspended into the liquid in the borehole;

a shear wave source comprising 2n members connected to the logging sonde where n is an integer greater than two, each member comprising an elongated plate attached to the logging sonde at one location and in such manner that the 2n members substantially form the parallelograms of a 2n-sided polygonal prism;

means connected to the logging sonde for vibrating the unattached portion of each of the 2n plates in a direction substantially normal to the flat surface of the plate substantially simultaneously and in substantially the same manner such that the unattached portions of adjacent plates vibrate in substantially opposite phase to generated a $2^n$-pole shear wave in the earth formation;

means connected to the logging sonde for detecting at at least one location in the liquid spaced longitudinally along the borehole from the 2n members the refracted compressional wave in the liquid caused by refraction of the $2^n$-pole shear wave.

11. The apparatus of claim 10 wherein n is equal to 3 and the vibrations of the six members generate an octopole shear wave in the earth formation.

12. The apparatus of claim 10 wherein the detecting means comprises 2n elongated plates attached at one location of the plate to the logging sonde in such manner that they substantially form the parallelograms of a 2n-sided polygonal prism and that they are aligned azimuthally with the 2n plates of the shear wave source.

13. An apparatus for acoustically logging an earth formation surrounding a borehole which contains a liquid said apparatus comprising:

a logging sonde adapted to be suspended into the liquid in the borehole;

2n sectors of a polarized, hollow, piezoelectric cylinder connected to the logging sonde so that the 2n sectors are substantially coaxial and that they surround a common axis, wherein n is an integer greater than two;

means connected to the logging sonde for applying substantially the same electrical pulse substantially simultaneously across each of the 2n sectors, causing the 2n sectors to vibrate radially, said electrical pulses being of such polarities that adjacent sectors will be caused to vibrate in substantially opposite phases, thereby producing a $2^n$-pole shear wave in the earth formation; and means connected to the logging sonde for detecting at at least one location in the liquid spaced longitudinally along the borehole from the 2n sectors the refracted compressional wave in the liquid caused by refraction of the $2^n$-pole shear wave.

14. The apparatus of claim 13, wherein the $2^n$ sectors are polarized radially, and wherein the electrical pulses are applied across the outer and inner cylindrical surfaces of the sectors.

15. The apparatus of claim 13, wherein the $2^n$ sectors are polarized circumferentially, and wherein the electrical pulses are applied to the $2^n$ sectors such that the electric field in each sector is substantially parallel to its polarization.

16. The apparatus of claim 15, wherein adjacent sectors are polarized in opposite circumferential directions and wherein the polarities of the electrical pulses applied are such that the electric fields in the $2^n$ sectors are in the same circumferential direction.

17. The apparatus of claim 15, wherein the $2^n$ sectors are polarized in the same circumferential direction, wherein any two adjacent sectors are separated by another sector of the hollow piezoelectric cylinder, and wherein the polarities of the electrical pulses applied are such that the electric fields in adjacent sectors are in opposite circumferential directions.

18. An apparatus for acoustically logging an earth formation surrounding a borehole which contains a liquid said apparatus comprising:

a logging sonde adapted to be suspended into the liquid in the borehole;

2n pairs of elongated piezoelectric plates, each pair bonded to each other by their flat surfaces wherein n is an integer greater than two, each pair being polarized in directions substantially perpendicularly to the flat surfaces of the pair, each pair attached at one location to the logging sonde, and each pair so attached to the sonde that the 2n pairs form substantially the parallelograms of a 2n-sided polygonal prism;

means for applying substantially the same electrical pulse to each pair substantially simultaneously to vibrate the unattached portions of each of the 2n pairs in a direction substantially normal to its flat surfaces, said electrical pulses being so applied that the unattached portions of adjacent pairs will vibrate in substantially opposite phases to generate a $2^n$-pole shear wave in the earth formation; and means connected to the logging sonde for detecting at at least one location in the liquid spaced longitudinally along the borehole from the 2n pairs the refracted compressional wave in the liquid caused by refraction of the $2^n$-pole shear wave.

* * * * *